United States Patent Office 3,813,232
Patented May 28, 1974

3,813,232
PROCESS FOR MAKING CARBON-CONTAINING
GLASSES
Ray B. Forker, Jr., Horseheads, and Joseph N. Panzarino, Big Flats, N.Y., assignors to Corning Glass Works, Corning, N.Y.
No Drawing. Filed Nov. 17, 1972, Ser. No. 307,464
Int. Cl. C03c 3/04, 15/09; H01b 1/06
U.S. Cl. 65—23                                  9 Claims

ABSTRACT OF THE DISCLOSURE

A process for making carbon-containing glasses from porous high-silica glass comprising the impregnation of the porous glass with acetophenone and sulfuric acid followed by a firing treatment to decompose the acetophenone to carbon and to consolidate the glass is disclosed. The process produces consolidated high-silica glass having a continuous carbon phase therein which is particularly useful for its uniform electrical properties, but is also characterized by high strength and improved refractoriness.

BACKGROUND OF THE INVENTION

Processes for impregnating porous glasses with carbon to produce electrically-conductive glasses are known. U.S. Pat. No. 2,556,616 to Ellis, for example, describes a process comprising impregnating porous glasses with soluble carbohydrates, particularly sugars, followed by drying and firing to convert the sugars to carbon, which can be used to produce electrically-conductive glasses. There are, however, many disadvantages associated with the use of sugar solutions to produce electrically-conductive glasses. First, sugar solutions are subject to fermentation and/or caramelization if allowed to stand in air, and thus require the use of stabilizing additives to obtain useful pot life. Secondary, sugar contains large numbers of hydroxy groups which can cause auto-oxidation of the carbon chains in the sugar on firing and, hence, loss of some of the desired carbon from the glass. And finally, it has not been possible to produce specified resistance characteristics in porous glasses using sugar impregnation techniques, partly because it is difficult to simultaneously control the variables of solution concentration, porous glass hydration, drying, and firing with a sufficient degree of precision to obtain reproducible resistance values.

It is therefore one object of the present invention to provide a process which avoids the numerous disadvantages associated with the production of electrically-conductive glasses using prior art methods.

It is a further object of the invention to provide a process which may be readily controlled to reproducibly manufacture glasses having specified resistance characteristics.

Other objects and advantages of the invention will become apparent from the following detailed description and examples thereof.

SUMMARY OF THE INVENTION

Briefly, our process for manufacturing carbon-containing glasses from porous high-silica glass comprises the steps of contacting the porous glass with acetophenone and sulfuric acid to produce an acetophenone- and sulfuric acid-impregnated glass, and then heating the impregnated glass under nonoxidizing conditions to a firing temperature at least sufficient to cause the decomposition of the acetophenone to carbon and the consolidation of the glass.

Contact with acetophenone and sulfuric acid may comprise either contact with a mixture consisting essentially of acetophenone and sulfuric acid, or contact with acetophenone to produce an acetophenone-impregnated glass article followed by contact with sulfuric acid to achieve sulfuric acid impregnation. The latter procedure is preferred because it permits control over the electrical resistivity of the finished glass article through control of the sulfuric acid impregnation step.

Heating the acetophenone- and sulfuric acid-impregnated glass article under non-oxidizing conditions may comprise heating in a vacuum, heating in a reducing atmosphere such as forming gas, or heating in an inert atmosphere such as nitrogen. The impregnated glass article should preferably be heated to the selected firing temperature at a rate below that which will cause excessive volatilization of acetophenone or blistering of the glass article. Following firing for a period of time at least sufficient to achieve the desired degree of decomposition, the glass may be cooled and used for a variety of electrical and mechanical applications.

A glass article produced according to the above process is electrically-conductive, having an electrical resistivity in the range from about 0.5 ohm-centimeter to about 780,000 ohm-centimeters, depending upon the impregnation treatment employed. The electrical conductivity of the article is due to the presence of a continuous carbon phase therein which can comprise up to about 10% of the weight of the treated glass. Such glass is also stronger and more refractory than the untreated glass material from which it is produced, having a use temperature about 200° C. in excess of the use temperature of the untreated glass.

DESCRIPTION OF THE PREFERRED EMBODIMENTS

Glasses which are particularly preferred for treatment according to the process of the present invention are high-silica porous glasses such as the so-called "96% silica glasses," which are used in high temperature applications because of their high annealing point and low thermal expansion. The manufacture of such glasses is described in detail in U.S. Pat. No. 2,106,744 to Hood et al., and generally involves the heat treatment of certain phase-separable alkali-borosilicate glasses to form an alkali-and-boron-rich phase and a silica-rich phase, and the subsequent acid-leaching of the phase-separated glass to remove the alkali-and-boron-rich phase. The resulting glass article, which typically comprises at least about 94% silica by weight and has a multiplicity of interconnecting, submicroscopic pores resulting from the removal of the soluble phase, may be consolidate to a non-porous, transparent glass article by appropriate heat treatment if desired. However, for the purposes of the present invention it is instead treated in the porous state, prior to consolidation, to impregnate the submicroscopic pore structure with carbon.

Glasses prepared by the method of the aforementioned Hood et al. patent are known in the art by the general designation "96% silica glasses" without particular regard for the exact silica content thereof, and this general designation is used herein with that meaning. Thus, it will be understood that the term "porous 96% silica glass" as it appears herein is used in the generic sense to include all porous alkali borosilicate glasses produced in accordance with the above-described method, irrespective of the exact silica content of the glass.

Extensive preparation of a selected porous glass prior to impregnation with acetophenone and sulfuric acid according to the process of the present invention is not required to obtain useful results. We do, however, prefer to dry the porous glass thoroughly prior to impregnation to remove all physically-held water from the pore structure of the material, to allow greater absorption of the acetophenone and sulfuric acid. This may conveniently be accomplished by heating at moderately elevated temperature, e.g., above about 100° C.

Because of the small size of the pores in a typical porous glass, it is desirable that the impregnating medium have as low a viscosity as possible to insure complete penetration into the pore structure of the glass in a reasonable time. Accordingly, impregnation at moderately elevated temperatures to decrease the viscosity of the impregnant is preferred, and we typically heat the acetophenone or the acetophenone-sulfuric acid mixture to a temperature of at least about 100° C. prior to contact with the porous glass. The actual impregnation of the porous glass is then suitably accomplished by immersion into the heated impregnating medium. For a typical porous glass having a pore diameter of about 40 A. and a surface area of about 240 square meters per gram, this technique permits complete impregnation of the pore structure within a period of about an hour.

If acetophenone has been employed as the sole impregnant in the initial step of the process, a second impregnation step in sulfuric acid is required to obtain sufficient carbon in the pore structure of the glass upon later firing. Again, we prefer to carry out this second impregnation step by immersing the glass into concentrated sulfuric acid at moderately elevated temperatures, e.g., 100° C., to increase the impregnation efficiency of the medium.

A two-stage impregnation procedure as described above, comprising an initial impregnation with acetophenone and a subsequent impregnation with concentrated sulfuric acid, is particularly preferred in carrying out the process of the present invention because the resistance of the final carbon-impregnated glass may be closely controlled by controlling the conditions of sulfuric acid impregnation. Thus we have found that glasses which have been thoroughly impregnated with acetophenone can be used to make high resistance materials with a relatively short sulfuric acid impregnation treatment, or instead used to make low resistance materials with a relatively long sulfuric acid impregnation treatment. The actual length of the treatment will of course depend also on the porosity and size of the glass article as well as the temperature of the treatment, but we have found that, for porous glass articles not exceeding about ¼ inch in thickness, sulfuric acid treatments in excess of about one hour in length are seldom required to minimize the electrical resistance of the article. Treatment times in excess of that required to obtain minimum resistance are not preferred since they produce glasses of increased resistance due to the loss of acetophenone from the pores of the article during the immersion in sulfuric acid.

Following treatment with sulfuric acid or with a sulfuric acid-acetophenone mixture, the glass article may optionally be washed in a non-aqueous organic solvent such as, for example, acetone, to remove excess impregnants from the surface of the article. This procedure is advantageous in certain cases because it produces a non-impregnated surface layer which, upon firing, results in an electrically-insulating glass skin on the surface of the electrically-conducting glass article. This feature is particularly desirable where the article is to be used as a heating element or an electrical resistor because it reduces the hazard of electrical shock.

Following the impregnation of the porous glass with acetophenone and sulfuric acid, the glass is typically fired in a non-oxidizing atmosphere to decompose the acetophenone to form a carbon condensation product and to consolidate the porous glass. Decomposition of the sulfuric acid also occurs during firing. Firing is preferably carried out in a reducing atmosphere to minimize the oxidation and loss of carbon. To insure complete decomposition of acetophenone as well as volatilization of sulfuric acid decomposition products and consolidation of the glass, the glass article should be fired to a temperature of at least about 1250° C. and preferably to about 1300° C. On the other hand, temperatures in excess of about 1500° C. are not required, and are preferably avoided because of the possibility of deformation of the article. The decomposition process is both time and temperature dependent, so that at lower firing temperatures some soaking may be required to insure complete decomposition of the impregnants.

Because the decomposition process yields gaseous by-products which must evolve through the pore structure of the glass article during heating, excessive rates of heating to the firing temperature can cause blistering of the glass through entrapment of these by-products. Also, excessive heating rates in the early stages of treatment cause volatilization of the acetophenone impregnant, and thus a decrease in the quantity of carbon retained in the glass. For these reasons, we prefer to employ a heating rate which is below that which will cause either excessive volatilization of acetophenone or blistering of the glass. We particularly prefer heating rates not exceeding about 25° C. per hour in the range from about 100° to 500° C., rates not exceeding about 100° C. per hour in the range from about 500° to 1000° C., and, in the case of thicker articles, rates not exceeding about 50° C. per hour in the range above 1000° C. These rates permit controlled evolution of reaction by-products during the heating process and minimization of acetophenone volatilization. Of course, such heating schedules may suitably be modified by soaking periods, for example, at 500° C. and 1000° C., to insure complete reaction prior to further heating, if desired.

Following heating under non-oxidizing conditions to convert the acetophenone to carbon and consolidate the glass, the glass article is cooled to room temperature at a suitable rate limited only by the thermal shock resistance of the article. Electrical contact with the carbon phase in the glass may then conveniently be obtained by the removal of surface glass to expose the carbon phase and the application of suitable electrical contact materials thereto.

The following examples will illustrate in detail the kinds of procedures which may be employed in carrying out the process of the present invention to produce electrically-conductive glass articles.

Example I

Four six-inch sections of a commercially-available porous 96% silica glass tubing, having an I.D. of .320 inch and a wall thickness of about 1 millimeter, were oven-dried at 250° C. for 16 hours to remove adsorbed water. The porous glass was composed of about 96% silica, less than about 3% $B_2O_3$, minor amounts of $Al_2O_3$, and only trace amounts of alkali. After oven-drying, the various porous glass samples were immersed in acetophenone at 100° C. for one hour, then immersed in concentrated sulfuric acid at 100° C. for various periods of time ranging from about 1 minute to about 15 minutes, then rinsed in acetone for about 2 minutes, and finally fired to convert the acetophenone to carbon and consolidate the porous glass.

The firing treatment was carried out in flowing forming gas composed of 92% nitrogen and 8% hydrogen by volume. The samples were first heated to 500° C. for one hour; then heated to 1000° C. at 100° C. per hour, holding at 1000° C. for two hours, and then further heated at a rate of 100° C. per hour to 1250° C., holding at 1250° C. for one-half hour. Finally, the samples were cooled to room temperature and tested for electrical conductivity and resistance.

Table I below gives the results obtained from the resistance measurements of each sample, as well as the impregnation treatment employed which gave the resistance values shown.

TABLE I

| Sample No. | Immersion time in— Acetophenone | Sulfuric acid | Resistance (ohms/inch) |
|---|---|---|---|
| 1 | 1 hour | 1 minute | 290,000 |
| 2 | do | 5 minutes | 24.3 |
| 3 | do | 10 minutes | 3.07 |
| 4 | do | 15 minutes | 2.85 |

From the data of the kind shown in Table I, we find that the resistance of the glass depends directly on the length of the sulfuric acid immersion, and that the resistance of the glass may be easily controlled by controlling the length of the sulfuric acid impregnation step of the process.

The effectiveness of the process of the present invention in the production of carbon-impregnated glasses having highly uniform resistance characteristics is shown in Example II below.

Example II

Ten porous 96% silica glass rods, six inches in length and ⅛ inch in diameter, were immersed for one hour in acetophenone at 100° C. and then for one hour in concentrated sulfuric acid at 100° C. After removal from the acid and rinsing in acetone for two minutes, the rods were fired in forming gas according to the firing schedule shown in Example I, cooled, and measured for electrical resistance. The results are shown in Table II below:

TABLE II

Electrical resistance of acetophenone and sulfuric acid-treated porous glass rods

| Sample No.: | Resistance (ohms/inch) |
|---|---|
| 1 | 12.7 |
| 2 | 12.9 |
| 3 | 12.4 |
| 4 | 12.9 |
| 5 | 12.9 |
| 6 | 12.9 |
| 7 | 12.4 |
| 8 | 12.9 |
| 9 | 12.4 |
| 10 | 12.7 |

The uniform electrical resistance of the glass rods treated according to the invention is quite apparent from the foregoing data. On the other hand, a series of five porous glass rods, each 3 millimeters in diameter, which had been treated in a sugar solution composed of 80% sugar and 20% water by weight according to the process described and claimed in U.S. Pat. No. 2,556,616, demonstrated considerably less uniformity as shown by the resistivity values determined for those glasses after firing to convert the sugar impregnant to carbon. Table III below sets forth the resistivity values obtained for the five samples.

TABLE III

Electrical resistivity of sugar treated porous glass rods

| Sample No.: | Resistivity (ohm-cm.) |
|---|---|
| 1 | 0.85 |
| 2 | 0.80 |
| 3 | 0.70 |
| 4 | 1.06 |
| 5 | 0.53 |

From the above data, it is apparent that the process of the present invention provides a useful means of producing electrically-conductive glasses exhibiting improved and uniform resistance characteristics which are suitable for use in a wide variety of electrical applications.

We claim:
1. A process for manufacturing a carbon-impregnated glass article from a porous glass article comprising the steps of:
   (a) contacting the porous glass article with acetophenone and sulfuric acid to produce an acetophenone- and sulfuric acid-impregnated glass article, and
   (b) heating the acetophenone- and sulfuric acid-impregnated glass article under non-oxidizing conditions to a firing temperature at least sufficient to decompose the acetophenone to carbon and to consolidate the porous glass.
2. A process according to claim 1 wherein the porous glass article is composed of porous 96% silica glass.
3. A process according to claim 2 wherein the step of contacting the porous glass article with acetophenone and sulfuric acid comprises containing the porous glass article with a mixture of acetophenone and sulfuric acid.
4. A process according to claim 2 wherein the step of contacting the porous glass article with acetophenone and surfuric acid comprises first contacting the porous glass article with acetophenone to produce an acetophenone-impregnated article and thereafter contacting the acetophenone-impregnated article with sulfuric acid to achieve sulfuric acid impregnation.
5. A process according to claim 4 wherein the step of contacting the porous glass article with acetophenone and sulfuric acid comprises immersing the porous glass article into acetophenone and sulfuric acid.
6. A process according to claim 5 wherein the step of heating the acetophenone- and sulfuric acid-impregnated glass article under non-oxidizing conditions comprises heating the article in a reducing atmosphere.
7. A process according to claim 6 wherein the reducing atmosphere is forming gas.
8. A process according to claim 7 wherein the acetophenone- and sulfuric acid-impregnated glass article is heated to a firing temperature of at least about 1250° C.
9. A process according to claim 8 wherein the acetophenone- and sulfuric acid-impregnated glass article is heated to the firing temperature at a heating rate below that which will cause excessive volatilization of acetophenone or blistering of the glass article.

References Cited
UNITED STATES PATENTS

| 2,556,616 | 6/1951 | Ellis | 65—32 X |
| 3,149,946 | 9/1964 | Elmer | 65—32 |
| 3,378,431 | 4/1968 | Smith | 65—32 X |
| 3,390,452 | 7/1968 | Huang | 65—32 X |
| 3,415,677 | 12/1968 | Sarver et al. | 65—30 X |
| 3,459,522 | 8/1969 | Elmer et al. | 65—32 X |
| 3,459,673 | 8/1969 | Best est al. | 106—52 |
| 3,640,906 | 2/1972 | Wojcik | 65—32 X |

FRANK W. MIGA, Primary Examiner

U.S. Cl. X.R.

65—30, 32, 60; 252—506, 509; 106—52